No. 863,406. PATENTED AUG. 13, 1907.
J. E. LABUS & G. J. SCHREIBER.
MOTOR VEHICLE ACTUATED BY FRICTION GEAR.
APPLICATION FILED MAR. 13, 1906.
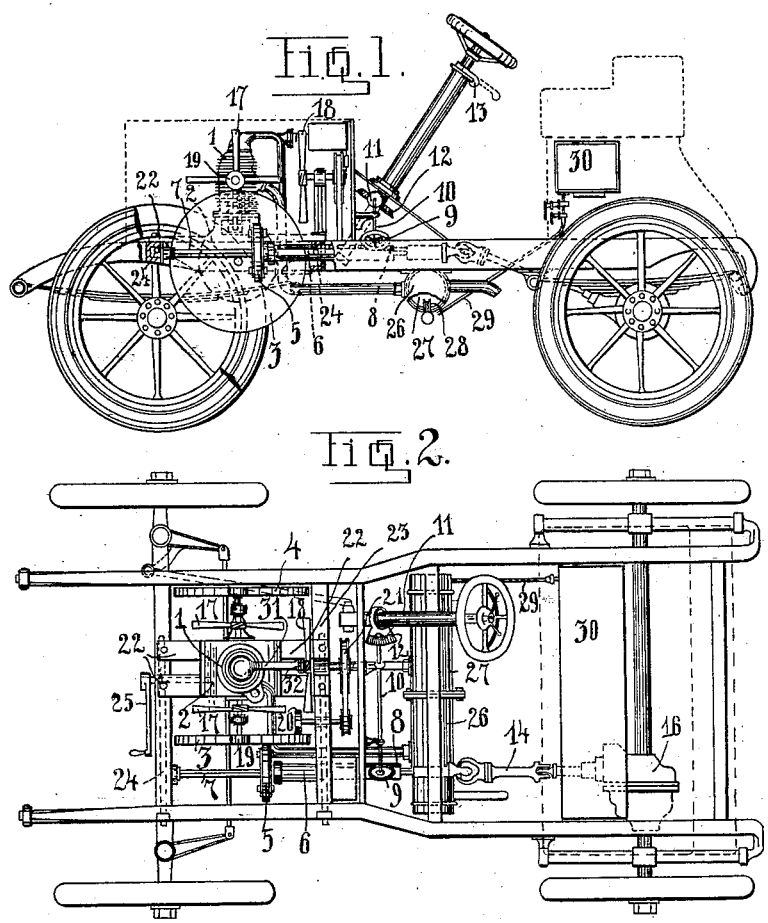

UNITED STATES PATENT OFFICE.

JOSEF EDUARD LABUS AND GUSTAV JULIUS SCHREIBER, OF VIENNA, AUSTRIA-HUNGARY.

MOTOR-VEHICLE ACTUATED BY FRICTION-GEAR.

No. 863,406.

Specification of Letters Patent.

Patented Aug. 13, 1907.

Application filed March 13, 1906. Serial No. 305,791.

*To all whom it may concern:*

Be it known that we, JOSEF EDUARD LABUS, architect, and GUSTAV JULIUS SCHREIBER, manufacturer, both subjects of the Emperor of Austria, and residents of Vienna, in the Empire of Austria, XIII, Bujattigasse 12 and Vienna VII, Halbgasse 4, respectively, have invented Improvements in Motor-Vehicles Actuated by Friction-Gear; and we do hereby declare the following to be a clear, full, and exact description of the invention, such as will enable others skilled in the art to which it appertains to make and use the same.

This invention relates to improvements in motor vehicles actuated by friction gear and consists in the construction and arrangement of the gear and of the motor, as well as in several improvements in different parts of the vehicle.

Figure 1 of the accompanying drawing is a side elevation of the vehicle, and Fig. 2 a plan.

As will be seen, the motor 1 is arranged in the fore-part of the vehicle with its shaft parallel to the wheel axles. The motor is furnished with two fly-wheels 3 and 4 situated outside the casing. The fly-wheel 3 is constructed as a disk and serves for transmitting the power to the friction wheel 5, which is adjustably mounted on a square shaft 7. The friction wheel 5 moreover is connected with a rod or sleeve 6 and rotates freely in a bearing independently of the sleeve. By the impulsion given to the friction wheel 5 from the fly-wheel 3 the shaft 7 is rotated, while the sleeve 6 remains at rest. In order to enable the speed to be varied as desired the sleeve 6 is moved longitudinally by means of a rack 8 formed thereon and a pinion. The pinion 9 is keyed on a shaft 10 and adjusted by a hand-lever 13 on the steering post which is geared with the shaft 10 through a pinion and a toothed sector 12. The shaft 7 engages with the differential gear 16 seated on the back-wheel axle, through the medium of the jointed shaft 14, and thereby actuates the back-wheels. The fly-wheels can be subjected to brake action by means of brake blocks which act on the edges thereof. The friction disk 5 can be pushed out forwards by being moved over the middle point of the fly-wheel 3, whereby the vehicle is driven backwards. When the friction wheel 5 is in the middle position the vehicle remains stationary.

The motor 1 which may have any number of cylinders as preferred may be provided with water-cooling as well as air cooling devices. In order that the cooling may be powerful in the latter case, fans 17, 17 or 18 are arranged on both sides as well as at the back of the motor. The fans 17, 17 are driven by friction disks 19 which rest on the rims of the fly-wheels 3 and 4. The fan 18 is actuated by a friction wheel 20 situated on the side of the fly-wheel 3 that is opposite the friction wheel 5, the shaft of the wheel 20 transmitting the motion to the fan 18 by means of belt pulleys and belts 21. The bearings of the three fans are carried on the body 2 of the casing. The arrangement of the friction wheel 20 is of particular importance as the wheel acts likewise as a counter-pressure wheel in relation to the friction wheel 5, whereby the bearing for the fly-wheel is relieved.

In order that the friction wheel 5 may always be adjusted to bear with sufficient pressure against the fly wheel 3, the motor 1 is movable on the ⊏-shaped bars 23, 23 through its supporting members 22 which are formed with transverse incisions. Moreover inside the ⊏-bars screw spindles 24 are arranged which engage in suitable screw threaded lugs in the frame members 22 (Fig. 1), whereby the motor can be adjusted in relation to the friction wheel 5. The motor is rotated when starting by means of a crank 25 and bevel wheels.

What we claim as our invention and desire to secure by Letters Patent is:

1. In a motor road vehicle actuated by friction gear, the combination of a vertically arranged motor provided with cooling ribs and seated in the fore part of the vehicle with its shaft parallel to the wheel axles, fly-wheels on the ends of said shaft, fans operatively connected with the fly-wheels, one of said fly-wheels being disk-shaped, and a friction-wheel adjustably arranged across the face of said disk-shaped fly-wheel, substantially as described.

2. In a motor road vehicle, a motor mounted with its shaft parallel to the wheel axles, a fly-wheel on the shaft adapted to act as a friction gear wheel, underframe members adapted to adjustably support the motor, frame extensions on the motor arranged to rest on the underframe members, adjusting screw spindles mounted in the underframe members and arranged to engage the motor frame extensions, a coöperating friction wheel adjustable across the face of the fly-wheel, and a shaft adapted to transmit the motion from the friction wheel to the driving axle, substantially as described.

3. In a motor road vehicle, a motor mounted with its shaft parallel to the wheel axles, a pair of fly-wheels on the shaft, fans geared to the peripheries of the fly-wheels, a friction wheel arranged to gear with and capable of adjustment across the face of one of the fly-wheels, and a shaft adapted to transmit the motion from the friction wheel to the driving axle, substantially as described.

4. In a motor road vehicle, a motor mounted with its shaft parallel to the wheel axles, a fly-wheel on the shaft adapted to act as a friction gear wheel, a coöperating friction wheel adjustable across the face of the fly-wheel, a shaft adapted to transmit the motion from the friction wheel to the driving axle, a counter-pressure friction wheel arranged to bear against the face of the fly-wheel on the opposite side to the said friction wheel, and a fan operatively connected with the counter-pressure wheel, substantially as described.

In testimony whereof we have signed our names to this specification in the presence of two subscribing witnesses.

JOSEF EDUARD LABUS.
GUSTAV JULIUS SCHREIBER.

Witnesses:
 FRANZ REITER,
 ALVESTO S. HOGUE.